United States Patent [19]
Toman et al.

[11] Patent Number: 4,968,775
[45] Date of Patent: Nov. 6, 1990

[54] THERMOSETTING POLYESTER COATING

[75] Inventors: Perry A. Toman, Medina; Alistair J. Ross, Strongsville, both of Ohio

[73] Assignee: The Glidden Company, Cleveland, Ohio

[21] Appl. No.: 507,782

[22] Filed: Apr. 12, 1990

[51] Int. Cl.$^5$ ............................................. C08G 63/02
[52] U.S. Cl. .................................... 528/272; 528/300; 528/302; 528/308; 528/308.6; 528/332; 528/335; 525/437
[58] Field of Search ............... 528/272, 300, 302, 308, 528/308.6, 332, 335; 525/437

[56] References Cited
U.S. PATENT DOCUMENTS
4,520,188 5/1985 Holzrichter et al. ............... 528/274

Primary Examiner—John Kight, III
Assistant Examiner—S. A. Acquah
Attorney, Agent, or Firm—Thomas M. Schmitz

[57] ABSTRACT

An improved thermosetting coil coating composition contains a binder of a thermosetting polyester polymer particularly resistant to crystallization and adapted to be crosslinked with an aminoplast resin. The polyester comprises the condensation copolymer of 2-methyl-1,3-propane diol, neopentyl glycol, isophthalic acid, and terephthalic acid.

8 Claims, No Drawings

THERMOSETTING POLYESTER COATING

This invention pertains to an improved thermosetting polyester polymer particularly resistant to crystallization and useful as a binder in a coil coating. The polyester can be crosslinked upon heating with an alkylated aminoplast crosslinker.

BACKGROUND OF THE INVENTION

This invention pertains to protective surface coatings commonly known as paint coatings. Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as an organic vehicle for the pigments, inerts, and other additives in wet coating compositions and further functions as a binder for the pigments and inert fillers in the cured or hardened paint film. The thermosetting polymeric binders of this invention are thermosetting binders based on the coreactive components of a functional polyester and a coreactive amine crosslinker.

Commercial liquid coatings applied to metallic substrates such as coil steel typically consist of a linear or lightly branched polyester resin adapted to crosslink upon heating with a melamine or similar amine based crosslinking agent. The polyester resins comprise the reaction product of polyfunctional acids with glycols. The cured coatings desirably exhibit excellent hardness and solvent resistance. However, such polyesters designed to meet the hardness, flexibility and solvent resistance requirements are unstable and crystallize out of organic solvent solution in a relatively short time.

U.S. Pat. No. 4,520,188 suggests a polyester based on the combination of glycols consisting of a neopentyl glycol and 1,4-cyclohexanedimethanol copolymerized with dicarboxylic acids and crosslinked with melamine resin. The coating is said to resist crystallization. However, the polyester polymer disclosed in U.S. Pat. No. 4,520,188 is not entirely resistant to crystallization and exhibits instability over time in respect to crystallizing out of an organic solvent solution.

It now has been found that polyester coatings, particularly polyester coil coatings, can be substantially improved based on polyesters containing a non-symmetrical glycol reactant comprising 2-methyl-1,3-propane diol in conjunction with other glycols and dicarboxylic acid reactants. Use of 2-methyl-l,3-propane diol not only maintains the superior film integrity properties such as hardness, bend flexibility, and resistance to solvent degradation, but dramatically improves the resistance to crystallization or formation of polyester crystals in storage. In essence, the polyester polymer of this invention exhibits excellent chemical and physical film properties while the resin itself is essentially immune to crystallization when dissolved in an organic solvent mixture. These and other advantages will become more apparent by referring to the detailed description and the illustrative examples.

SUMMARY OF THE INVENTION

Briefly, the coating composition of this invention contains a thermosetting binder comprising by weight between about 60% and 95% and preferably between 80% and 95% of functionally reactive polyester polymer in combination with between 40% and 5% and preferably between 20% and 5% coreactive aminoplast crosslinking agent adapted to crosslink with the polyester, said polyester comprising coreactant of about 5 to 50 weight percent of 2-methyl-1,3-propane diol, about 5 to 60 weight percent neopentyl glycol, about 5 to 40 weight percent isophtalic acid, about 5 to 40 weight percent terephthalic, where the mole percent ratio of diol and glycol components are above 51% and the mole ratio of alcohol equivalents to carboxyl equivalents is between about 1.03 and 1.15. The number average molecular weight as measured by GPC is preferably between about 3,000 and 6,000.

DETAILED DESCRIPTION OF THE INVENTION

The coating composition of this invention is based on a polymeric binder comprising a thermosetting polyester adapted to crosslink with an aminoplast crosslinker.

Referring first to the polyester polymer, the polyester is primarily based on a glycol reactant consisting of 2-methyl-1,3-propane diol. In accordance with this invention, the polyester comprises the condensation polymer of the following reactants on a weight percent basis:

(a) 5 to 50 of 2-methyl-1,3-propane diol;
(b) 5 to 60 of neopentyl glycol;
(c) 5 to 40 of isophthalic acid;
(d) 5 to 40 of terephthalic acid;
(e) 0 to 20 of 1,6 hexane diol or similar symmetrical glycol;
(f) 0 to 8 of trimethylol propane
(g) 0 to 20 of adipic acid or similar symmetrical aliphatic dicarboxylic acid; and
(h) 0 to 8 of trimellitic anhydride.

When a symmetrical linear diol is used, the preferred diol is 1,6-hexane diol, although other useful diols would include ethylene glycol and 1,4-butane diol. When a symmetrical, aliphatic, linear dicarboxylic acid is used, adipic acid is preferred although other useful dicarboxylic acids include succinic, suberic and sebacic acids or similar even number carbon, symmetrical, dicarboxylic acids. The primary component of the polyester comprises the 2-methyl-1,3-propane diol, which has the following structure:

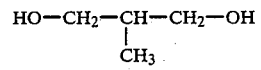

The total equivalent percent of the alcohol (glycol) functional reactants is at least 51 percent and preferably between 51 and 55 equivalent percent. The ratio of reactive alcohol equivalents to reactive carboxyl equivalents is preferably above about 1.03 and between about 1.03 and 1.15. The Acid No. is between 5 and 15 while the hydroxyl number is above 30 and preferably between about 35 and 70. The number average molecular weight of the polyester, as measured by GPC is between about 3,000 and 6,000 and preferably between about 4,000 and 5,000.

Preferred polyesters comprise the condensation reaction product, on a weight percent basis, of between 5 and 50 of 2-methyl-1,3-propane diol, between 5 and 60 of neopentyl glycol, between 5 and 40 of isophthalic acid, and between 5 and 40 of terephthalic acid. Other preferred compositions further contain 0 to 20 weight percent of 1,6-hexane diol and/or 0 to 8 weight percent trimethylol propane, and/or 0 to 10 weight of adipic acid and/or 0 to 3 weight percent trimellitic anhydride.

The polyester can be produced by solvent or bulk polymerization although bulk polymerizations with minor amounts of refluxing solvent are preferred. The raw materials can be charged in bulk and esterification polymerized at temperatures typically between 180° C. to 240° C. although moderately higher or lower temperatures can be utilized satisfactorily. An esterification catalyst can be used, typically at less than 1% levels based on charge, such as an organo tin compound. Polymerization is continued until the Acid No. is below about 12.

The foregoing hydroxyl functional, low molecular weight polyester polymer is combined with a coreactive amine derivative crosslinking resin such as aminoplast or phenoplast resin. Aminoplast resins are preferred and further include glycolurils. Examples of useful aminoplast resin are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from to about 8 carbon atoms. In a melamine molecule, for instance, up to 3 of the 6 active hydrogens on the amine group can be advantageously substituted with an alkanol group having 1-8 carbon atoms. Higher levels such as 6 substitution can be used as in Cymel 300 which contains 6 substituted methylol groups. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure where substitute constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methylated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference. Less preferred amine derivatives are phenolplast resins, or phenol-aldehyde resins which are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make these phenolplast resins are phenol, o, m, or p-cresol, 2,4-xylenol, 3,4-xylenol, 2,5-xylenol, cardanol, p-tert-butylphenol, and the like. Aldehydes useful in this invention are formaldehyde, acetaldehyde and propionaldehyde. Desirable phenolplast resins are polymethylol phenols wherein the phenolic group is etherified with an alkyl, alcohol such as methyl, ethyl, propyl, etc. alcohol.

On a polymer solids weight basis, the blend of polymers comprises broadly between 60% and 95% polyester polymer, and between 40% and 5% aminoplast crosslinking resin. Preferred polymeric blend compositions comprise 85% and 95% polyester polymer and 15% and 5% crosslinker such as aminoplast resin.

A protective surface paint coating, such as a coil coating, can be produced by combining the polyester resin with opacifying pigment such as titanium dioxide as well as mineral filter pigment along with organic solvent and other additives. Opacifying pigment can be added at the level of about 20 to 110 weight parts to 100 weight parts of polymeric binder comprising polyester resin plus aminoplast crosslinking resin. A crosslinking catalyst can be added such as about 0.1% to 1.0% p-toluene sulfonic acid based on the weight of the polymeric binder coreactants.

The coating composition of this invention can be applied as a thin film on a metal substrate to provide, when cured, a film thickness of about 0.3 to 1.2 mils or more as desired. The coating film can be cured by heating the coated substrate to about 350° F. to 600° F. for 15-90 seconds. A particularly preferred coating is a coil coating applied to coil steel substrates.

The following illustrative examples set forth the merits of the invention.

EXAMPLE 1

Preparation of an improved coil polyester polymer

| Material | Weight (grams) |
| --- | --- |
| A. 2-methyl-1,3-propanediol | 494.2 |
| Neopentyl glycol | 570.9 |
| 1,6 Hexanediol | 337.9 |
| Adipic acid | 278.0 |
| Butyl Stannoic acid | 1.75 |
| B. Terephthalic acid | 852.6 |
| Isophthalic acid | 852.6 |
| C. Trimellitic anhydride | 103.0 |

Add (A) to a 5 liter flask. Stir, purge with nitrogen and heat to 90° C. Add (B) and heat to 165° C. Collect distillate while raising temperature to 250° C., over 4 hours. 430 mls of distillate is collected during this stage. Cool to 230° C. and add (C). Heat to 250° C. and hold until an acid value of 6.6 is reached. The polymer is dissolved in a mixture of Solvesso 150* and propylene glycol monomethyl ether acetate. The final resin has a Gardner color of 3, an acid number of 6.0 and a Gardner Holt viscosity of Z5+½ at a ASTM non-volatile content of 63.7.

*A mixture of aromatic hydrocarbons, having a boiling range of 350°-420° F.

A coating composition was prepared from this resin by adding 10% by melamine. A film was applied, heated, and crosslinked on a metallic substrate. The resultant cured film has an F pencil hardness and over 100 MEK double rub resistance. The coating exhibited a lack of cracking in a zero T flexibility test. The resin solution shows no tendency for crystallization over 360 days at 77° F.

EXAMPLE 2

A polyester was prepared as in Example 1, except using the following materials:

| Material | Weight (grams) |
|---|---|
| A. 2-methyl-1,3-propanediol | 607.4 |
| Neopentyl Glycol | 745.3 |
| Butyl Stannoic Acid | 1.75 |
| B. Terephthalic acid | 1018.4 |
| Isophthalic acid | 1018.4 |
| C. Trimellitic anhydride | 100.6 |

The final resin (dissolved in Solvesso 150 and propylene glycol monomethyl ether acetate had a color of 2, an acid number of 6.7 and a viscosity of Z6+½ at 64.4 NV.

A coating composition was prepared from this resin plus 10% melamine and crosslinked on a metallic substrate. The resultant film had a F pencil hardness and over 100 MEK double rub resistance. The coating exhibited a lack of cracking in a one T flexibility test. The resin solution shows no tendency for crystallization over 270 days at 77° F.

EXAMPLE 3

Prepare a polyester as in Example 1, but use:

| Material | Weight (grams) |
|---|---|
| A. 2-methyl-1,3-propanediol | 247.7 |
| Neopentyl glycol | 917.0 |
| 1,6-hexanediol | 250.1 |
| Adipic acid | 206.0 |
| Butyl Stannoic acid | 1.75 |
| B. Terephthalic acid | 882.8 |
| Isophthalic acid | 882.8 |
| C. Trimellitic anhydride | 100.9 |
| D. Solvesso 150 | 1286.4 |
| Propylene glycol monomethyl ether acetate | 426.3 |

The final resin solution has a Gardner-Holt viscosity of Z4+¾, a non-volatile content of 63.6 and an acid number of 4.6.

EXAMPLE 4

Prepare a polyester as in Example 1, but use:

| Material | Weight (grams) |
|---|---|
| A. 2-methyl-1,3-propanediol | 367.4 |
| Neopentyl Glycol | 786.3 |
| 1,6-hexanediol | 251.7 |
| Adipic acid | 207.3 |
| Butyl Stannoic acid | 1.75 |
| B. Terephthalic acid | 887.6 |
| Isophthalic acid | 887.6 |
| C. Trimellitic anhydride | 101.3 |
| D. Solvesso 150 | 1284.9 |
| Propylene glycol monomethyl ether acetate | 425.8 |

The final resin solution has a non-volatile content of 63.4%, a Gardner-Holt bubble tube viscosity of Z5 and an acid number of 5.8. The resin solution is stable to crystallization for up to 120 days.

EXAMPLE 5

Prepare a polyester as in Example 1, but use:

| Material | Weight (grams) |
|---|---|
| A. 2-methyl-1,3-Propanediol | 427.0 |
| Neopentyl glycol | 720.7 |
| 1,6-Hexanediol | 252.3 |
| Adipic Acid | 207.7 |
| B. Terephthalic Acid | 890.1 |
| Isophthalic Acid | 890.1 |
| Butyl Stannoic Acid | 3.3 |
| C. Trimellitic Anhydride | 101.6 |
| D. Solvesso 150 | 1284.9 |
| Propylene glycol monomethyl ether acetate | 425.8 |

The resin shows no tendency for crystallization for over 80 days at 77° F.

EXAMPLE 6

Prepare a polyester as in Example 1, but use:

| Material | Weight (grams) |
|---|---|
| A. 2-Methyl-1,3-Propanediol | 471.9 |
| Neopentyl glycol | 652.6 |
| 1,6 Hexanediol | 243.9 |
| Adipic Acid | 200.8 |
| B. Terephthalic Acid | 860.8 |
| Isophthalic Acid | 860.8 |
| Butyl Stannoic Acid | 3.3 |
| C. Trimellitic Anhydride | 98.3 |
| D. Solvesso 150 | 1131.8 |
| Solvesso 100 | 452.7 |
| Dipropylene glycol monomethyl ether | 226.4 |

The resin has a non-volatile content (by weight) of 62.0%, and a Gardner-Holt bubble tube viscosity of Z2+½. No crystallization is evident after 30 days at 77° F.

(Solvesso 100 is an aromatic hydrocarbon blend with a boiling range of 306°–350° F.

EXAMPLE 7

Prepare a polyester as in Example 1, but use:

| Material | Weight (grams) |
|---|---|
| A. 2-Methyl-1,3-Propanediol | 473.8 |
| Neopentyl Glycol | 642.2 |
| 1,6 Hexanediol | 244.9 |
| Adipic Acid | 201.7 |
| B. Terephthalic Acid | 864.3 |
| Isophthalic Acid | 864.3 |
| Butyl Stannoic Acid | 3.3 |
| C. Trimellitic Anhydride | 98.7 |
| D. Solvesso 150 | 1131.4 |
| Solvesso 100 | 452.6 |
| Dipropylene Glycol monomethyl ether | 226.3 |

The resin has a non-volatile content (by weight) of 61.8%, and a Gardner-Holt bubble tube viscosity of Z3. No crystallization is evident after 30 days.

EXAMPLE 8

Prepare a polyester as in Example 1, but use:

| Material | Weight (grams) |
|---|---|
| A. 2-Methyl-1,3-Propanediol | 473.6 |
| Neopentyl glycol | 647.3 |
| 1,6 Hexanediol | 235.5 |

-continued

| Material | Weight (grams) |
|---|---|
| Adipic Acid | 194.0 |
| B. Terephthalic Acid | 869.9 |
| Isophthalic Acid | 869.9 |
| Butyl Stannoic Acid | 3.3 |
| C. Trimellitic Anhydride | 99.7 |
| D. Solvesso 150 | 1131.2 |
| Solvesso 100 | 452.5 |
| Dipropylene Glycol monoethyl ether | 226.2 |

The resin has a non-volatile content (by weight) of 61.5%, and a Gardner-Holt bubble tube viscosity of Z4+⅓. No crystallization is evident after 20 days.

EXAMPLE 9

Prepare a polyester as in Example 1, but use:

| Material | Weight (grams) |
|---|---|
| A. 2-Methyl-1,3-Propanediol | 473.8 |
| Neopentyl Glycol | 642.2 |
| 1,6-Hexanediol | 244.9 |
| Adipic Acid | 201.7 |
| B. Terephthalic Acid | 864.3 |
| Isophthalic Acid | 864.3 |
| Butyl Stannoic Acid | 3.3 |
| C. Trimellitic Anhydride | 98.7 |
| D. Solvesso 150 | 1131.6 |
| Solvesso 100 | 452.6 |
| Dipropylene glycol monomethyl ether | 226.3 |

The resin has a non-volatile content (by weight) of 61.8%, and a Gardner-Holt bubble tube viscosity of Z5. No crystallization is evident after 40 days.

EXAMPLE 10

Prepare a polyester as in Example 1, but use:

| Material | Weight (grams) |
|---|---|
| A. 2-Methyl-1,3-Propanediol | 414.8 |
| Neopentyl glycol | 700.0 |
| 1,6 Hexanediol | 245.1 |
| Adipic Acid | 201.7 |
| B. Terephthalic Acid | 864.6 |
| Isophthalic Acid | 864.6 |
| Butyl Stannoic Acid | 3.3 |
| C. Trimellitic Anhydride | 98.7 |
| D. Solvesso 150 | 1131.6 |
| Solvesso 100 | 452.6 |
| Dipropylene glycol monomethyl ether | 226.3 |

The resin has a non-volatile content (by weight) of 61.8%, and a Gardner-Holt bubble tube viscosity of Z5. No crystallization is evident after 40 days.

EXAMPLE 11

Prepare a polyester as in Example 1, but use:

| Material | Weight (grams) |
|---|---|
| A. 2-Methyl-1,3-Propanediol | 475.3 |
| Neopentyl Glycol | 633.3 |
| 1,6-Hexanediol | 245.7 |
| Adipic Acid | 202.3 |
| B. Terephthalic Acid | 867.0 |
| Isophthalic Acid | 867.0 |
| Butyl Stannoic Acid | 3.3 |
| C. Trimellitic Anhydride | 99.0 |
| D. Solvesso 150 | 1131.5 |
| Solvesso 100 | 452.6 |
| Dipropylene glycol monomethyl ether | 226.3 |

The resin has a non-volatile content (by weight) of 61.8%, and a Gardner-Holt bubble tube viscosity of Z4+½. No crystallization is evident after 40 days.

COMPARATIVE EXAMPLES

COMPARATIVE EXAMPLE A

Preparation of a polymer not containing 2-methyl-1,3-Propanediol.

Prepare a polyester as in Example 1, but use:

| Material | Weight (grams) |
|---|---|
| A. Neopentyl glycol (90% aqueous slurry) | 1216.2 |
| 1,6 Hexanediol | 323.5 |
| Adipic Acid | 266.3 |
| B. Terephthalic Acid | 816.8 |
| Isophthalic Acid | 816.8 |
| Butyl Stannoic Acid | 1.0 |
| C. Trimellitic Anhydride | 98.5 |
| D. Solvesso 150 | 1342.7 |
| Propylene glycol monomethyl ether acetate | 456.3 |

The resin has a non-volatile content of 60.9%, a Gardner-Holt bubble tube viscosity of Z1-Z2, and an acid number of 13.5. The resin crystallizes out of solution after a period of 21 days.

COMPARATIVE EXAMPLE B

Preparation of a polymer containing cyclohexanedimethanol.

Prepare a polyester as in Example 1, but use:

| Material | Weight (grams) |
|---|---|
| A. Neopentyl glycol | 1340 |
| Trimethylol propane | 91 |
| Cyclohexanedimethanol | 60 |
| Butyl Stannoic Acid | 2.8 |
| B. Isophthalic Acid | 815 |
| Terephthalic Acid | 724 |
| Adipic Acid | 513 |
| C. Solvesso 150 | 807 |
| Propylene glycol monomethyl ether acetate | 807 |

The final resin has a non-volatile by weight content of 65.6, a Gardner-Holt bubble tube viscosity of Z4, an acid value of 5.6 (on non-volatile content) and a Gardner color of 3. This resin crystallizes from solution within 24 hours.

COMPARATIVE EXAMPLE C

Preparation of a polymer similar to comparative example B but without cyclohexanedimethanol.

Prepare a polyester as in Example 1, but use:

| Material | Weight (grams) |
|---|---|
| A. Neopentyl glycol | 1372 |
| Trimethylol propane | 85 |
| B. Adipic Acid | 686 |

-continued

| Material | Weight (grams) |
| --- | --- |
| Butyl stannoic acid | 2.8 |
| Isophthalic acid | 732 |
| Terephthalic acid | 625 |

This resin is dissolved in a 75/25 w/w mixture of Solvesso 150 and propylene glycol monomethyl ether acetate. The non-volatile content is 64.5%. the Gardner-Holt bubble tube viscosity is Z1+½ and the acid number is 8.5. The resin solution is completely clear after a 24 hour period, but crystallizes within several days.

We claim:

1. A thermosetting protective surface coating composition containing a reactive, crystalline resistant polyester binder, the improvement comprising on a weight basis:
   between 60% and 95% of functionally reactive polyester comprising the condensation reaction product of the following reactants:
   5% to 50% of 2-methyl-1, 3-propane diol
   5% to 60% of neopentyl glycol
   5% to 40% of isophthalic acid, and
   5% to 40% of terephthalic acid, where said polyester has an hydroxyl number above about 35 and a weight average molecular weight between about 3,000 and 6,000; and
   between 5% and 40% of an aminoplast crosslinking resin adapted to coreact with said polyester upon heating.

2. The protective surface coating of claim 1 where the polymeric binder comprises between about 80% and 95% said polyester and between about 5% and 20% said aminoplast resin.

3. The protective surface coating of claim 1 where the hydroxyl number of the polyester is between about 35 and 70.

4. The protective surface coating of claim 1 where the reactants comprise between about 1.03 and 1.15 equivalent alcohol reactants to 1 equivalent of carboxyl reactants.

5. The protective surface coating composition of claim 1 containing an additional reactant between about 0% to 20% by weight of a symmetrical glycol.

6. The protective surface coating composition of claim 5 where the symmetrical glycol is 1,6-hexane diol.

7. The protective surface coating composition of claim 1 containing an additional reactant between 0% and 8% trimethylol propane.

8. The protective surface coating composition of claim 1 containing an additional reactant between about 0% and 20% of a symmetrical aliphatic dicarboxylic acid.

* * * * *